United States Patent [19]

Graham et al.

[11] Patent Number: 5,623,282
[45] Date of Patent: Apr. 22, 1997

[54] METHOD AND SYSTEM FOR THE DIRECT MANIPULATION OF CELLS IN AN ELECTRONIC SPREADSHEET PROGRAM OR THE LIKE

[75] Inventors: Christopher E. Graham, Redmond; Ross A. Hunter, Woodinville; Lisa R. James, Bellevue, all of Wash.

[73] Assignee: Microsoft Corporation, Redmond, Wash.

[21] Appl. No.: 219,868

[22] Filed: Mar. 30, 1994

Related U.S. Application Data

[63] Continuation of Ser. No. 815,656, Dec. 31, 1991, abandoned.

[51] Int. Cl.⁶ .................................................. G06F 7/00
[52] U.S. Cl. .................... 345/121; 395/764; 395/768; 395/792
[58] Field of Search ................... 395/145–149, 395/155–159, 600; 345/121, 133, 145, 146, 902, 115, 116, 118

[56] References Cited

U.S. PATENT DOCUMENTS

| | | | |
|---|---|---|---|
| 3,895,375 | 7/1975 | Williams | 340/791 |
| 4,674,043 | 6/1987 | Hernandez et al. | 364/900 |
| 4,686,522 | 8/1987 | Hernandez et al. | 340/747 |
| 4,723,211 | 2/1988 | Barker et al. | 395/147 |
| 4,788,538 | 11/1988 | Klein et al. | 340/709 |
| 4,806,916 | 2/1989 | Raskin et al. | 340/709 |
| 5,021,973 | 6/1991 | Hernandez et al. | 340/709 |
| 5,157,763 | 10/1992 | Peters et al. | 340/721 |
| 5,422,993 | 6/1995 | Fleming | 395/159 |

OTHER PUBLICATIONS

SuperPaint 1.1, Silicon Beach Software, pp. 25–28, 1988.

*Primary Examiner*—Steven Saras
*Attorney, Agent, or Firm*—Seed and Berry LLP

[57] ABSTRACT

A method and system for directly manipulating cells in an electronic spreadsheet program or the like. After the user has selected the cells to be manipulated, the user merely positions the cursor over any part of the outside border of the selected group of cells, depresses and holds down a predefined mouse button, drags the border to a new location and then releases the mouse button. Depending upon which mouse button or control key was depressed, the user may be presented with options such as whether the manipulation should be to move or copy the selected cells, or the selected cells may be moved and no option presented. Depending upon which control key was depressed or upon the location of the repositioned border, the selected cells may be pasted over existing cells, or they may be inserted into the spreadsheet causing the existing cells to be shifted right and/or down.

19 Claims, 10 Drawing Sheets

METHOD AND SYSTEM FOR THE DIRECT MANIPULATION OF CELLS IN AN ELECTRONIC SPREADSHEET PROGRAM OR THE LIKE

CROSS-REFERENCE TO RELATED APPLICATION

This application is a continuation of U.S. patent application Ser. No. 07/815,656, filed Dec. 31, 1991, now abandoned.

TECHNICAL FIELD

This invention relates generally to data manipulation and particularly to the direct manipulation of cells by a user of an electronic spreadsheet system or the like.

BACKGROUND OF THE INVENTION

A primary use of computers, especially personal computers, is information processing. There are a wide variety of application programs available that "computerize" information processing tasks that were previously performed manually. Once such application program is Microsoft Excel, an accounting program for personal or business use. In application programs such as Microsoft Excel, a worksheet is the primary document used to store and manipulate data. One commonly used type of worksheet is a spreadsheet, which is a two dimensional, rectangular grid of a finite number of columns and rows. The intersection of each column and row is a cell, the basic unit of a worksheet in which a user may enter and store data. The active cell is displayed with a dark border, which indicates that the cell is selected. The next data the user types after selecting a cell will be entered into the selected cell or the next command the user chooses will be applied to the selected cell. If more than one cell is selected, the first cell selected is the active cell.

The ability to manipulate selected portions of data in a worksheet is a common feature of electronic spreadsheet programs. Presently, there are spreadsheet programs which allow a user to select a cell or group of cells and manipulate it in some way, such as moving it to a new location in the worksheet, copying it to a new location in the worksheet, or deleting it. The problem with these prior art systems is that they require a user to go through several time-consuming steps before the cell manipulation is actually carried out.

For example, to move a cell or a group of cells from one location to another in a worksheet using a typical prior art system, a user is required to (1) select the cell or group of cells to be manipulated; (2) delete or "cut" the selected cell or group of cells from the first location using a combination of keys or by selecting the delete or cut command; (3) move the cursor to the new location in the worksheet where the selected cell or group of cells is to be moved; and (4) insert or "paste" the selected cell or group of cells at the new location using a combination of keys or by selecting the insert or paste command. Similar steps are required for copying the contents of a cell or group of cells from one location to another in a document.

In electronic spreadsheet programs such as Microsoft Excel that support mouse operations, a user may select a cell with a mouse by positioning the pointer over a cell and then depressing and releasing a predefined mouse button. A user may select a group of cells with a mouse by positioning the pointer at the beginning of the selection, depressing a predefined mouse button, dragging the pointer to the end of the selection while holding down the mouse button, and then releasing the mouse button. After selection, cut and paste operations such as described above may be performed on the selected cell or cells.

The prior art systems require a user to be familiar with a variety of function keys and edit commands. When a user is making numerous revisions to a worksheet it is inconvenient to have to perform so many steps in order to move or copy cells from one location to another in a worksheet. The user is forced to perform awkward key combinations such as depressing the shift key and the delete key at the same time. No technique is known in the electronic spreadsheet environment for moving or copying cells without going through the time-consuming cut and paste type operations.

SUMMARY AND OBJECTS OF THE INVENTION

In a preferred embodiment, the present invention contemplates a method and system for directly manipulating cells in an electronic spreadsheet program or the like. After the user has selected the cells to be manipulated, the manipulation may be carried out with little effort on the part of the user. In a preferred embodiment, to move a group of selected cells, the user merely positions the cursor over any part of the outside border of the selected group of cells, depresses and holds down a predefined mouse button, drags the border to a new location and then releases the mouse button. Depending upon which mouse button or control key was depressed, the user may be presented with options such as whether the manipulation should be to move or copy the selected cells, or the selected cells may be moved and no option presented. Depending upon which control key was depressed or upon the location of the repositioned border, the selected cells may be pasted over existing cells, or they may be inserted into the spreadsheet causing the existing cells to be shifted right and/or down.

Accordingly, it is an object of the present invention to provide an improved method and system for directly manipulating cells in an electronic spreadsheet environment or the like.

It is another object of the present invention to provide a visual representation of selected cells being moved or copied to a different location in the worksheet.

A further object of the present invention is to provide a visual indicator of when selected cells are to be inserted rather than pasted in the worksheet. These and other objects will be apparent to those of ordinary skill in the art as the invention is described more fully below.

DETAILED DESCRIPTION OF THE INVENTION

The present invention is best understood with reference to the preferred embodiment illustrated in FIGS. 1–9.

Figure 1:
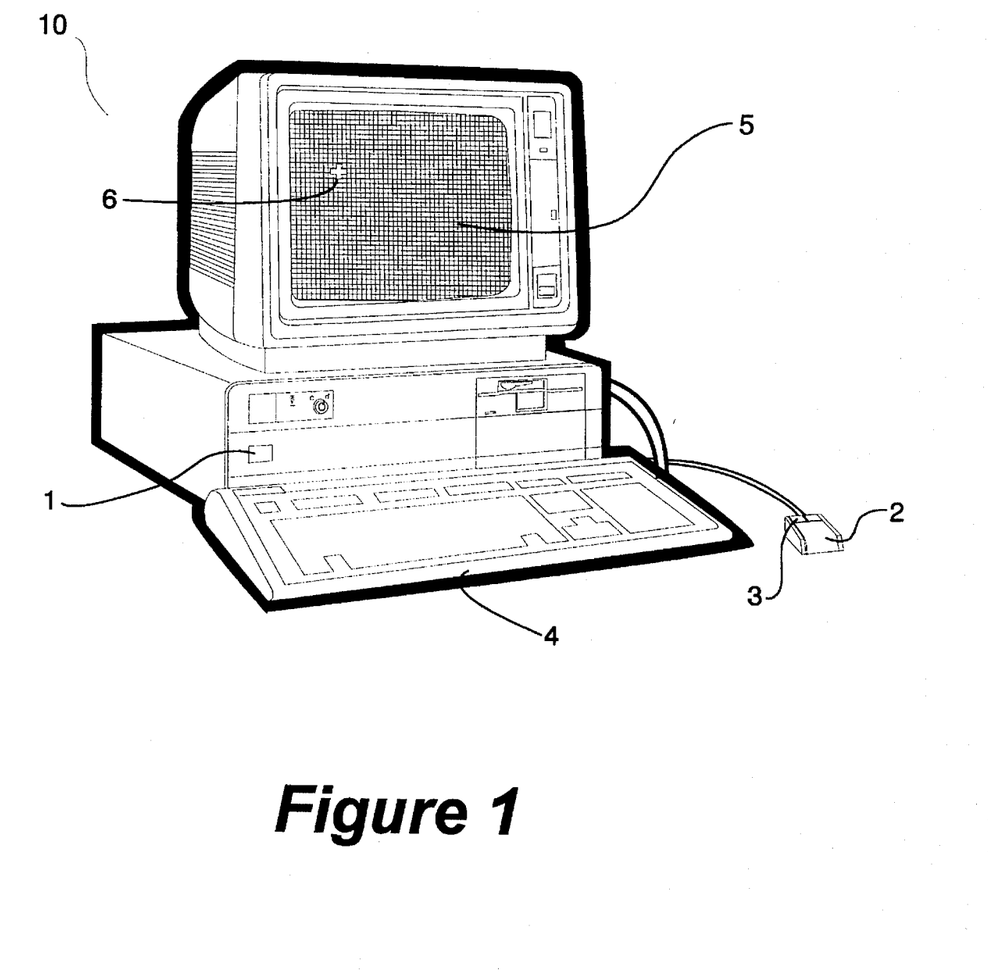
FIG. 1 shows a computer system running an electronic spreadsheet program, the computer system having a mouse, keyboard, and display screen.

FIG. 1 illustrates a computer system 10 running an electronic spreadsheet program. The computer system 10 comprises a CPU 1, a mouse input device 2 including a control input button 3, a keyboard 4 and a display screen 5. The control input button 3 actuates a contact switch to generate selection signals and other commands. The user moves the mouse along a flat surface to generate pointer position input commands which are supplied to the CPU 1. Mouse movement is translated into x-y coordinates on the display screen 5 in a known manner. A pointer 6 on the display screen 5 moves in connection with the mouse 2.

Figure 2:
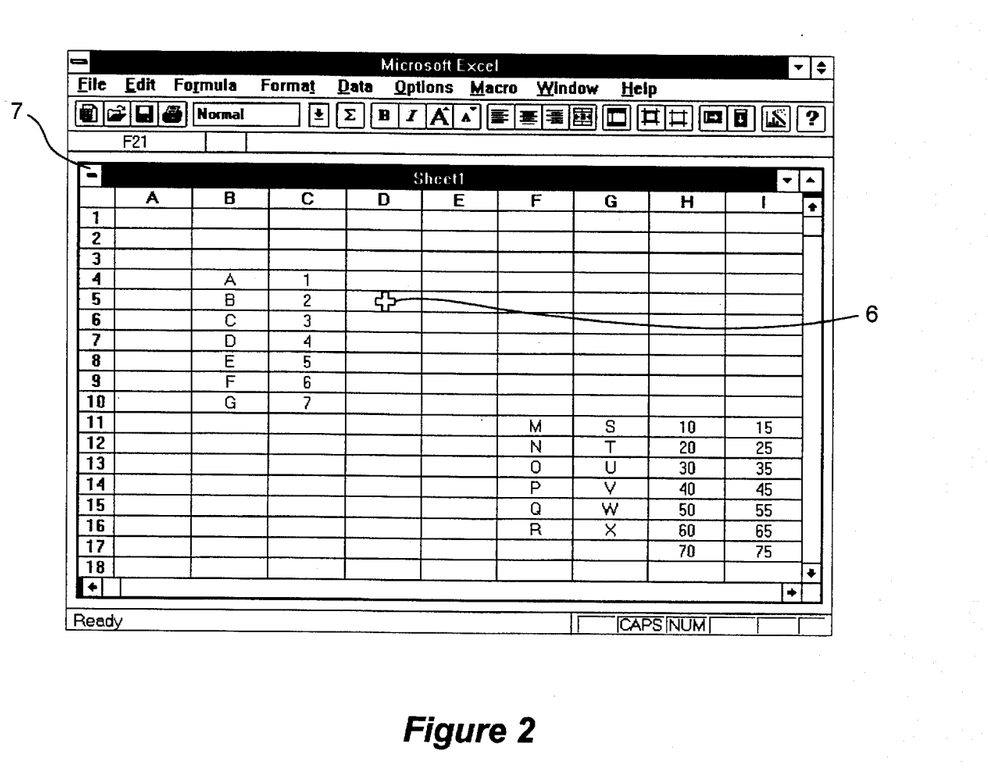
FIG. 2 shows a typical electronic spreadsheet window, where the worksheet is arranged in columns and rows, and a pointer as they are seen on the display screen of FIG. 1.

FIG. 2 shows a typical electronic spreadsheet window 7 and a pointer 6 as they are seen on the display screen 5 of FIG. 1. The worksheet contains a grid of columns and rows, the intersection of which is referred to as a cell. The mouse 2 is used to position the pointer 6, normally in the shape of a plus sign, over the cells displayed in the spreadsheet window. When the mouse button 3 is depressed, the cell under the pointer 6 is given a dark border and it becomes the active cell. If the mouse 2 is moved while the mouse button 3 is depressed, the selection is continued and additional cells are surrounded by the dark border as the pointer is dragged over them to signify selection. The dark border 9 will appear around the cells as they are selected. All of the selected cells will be black except for the first cell in the selection, called the active cell, which remains white. The selection begins with the cell over which the pointer is positioned when the mouse button 3 is depressed, and continues to the cell over which the pointer is positioned when the mouse button 3 is released.

Figure 3:
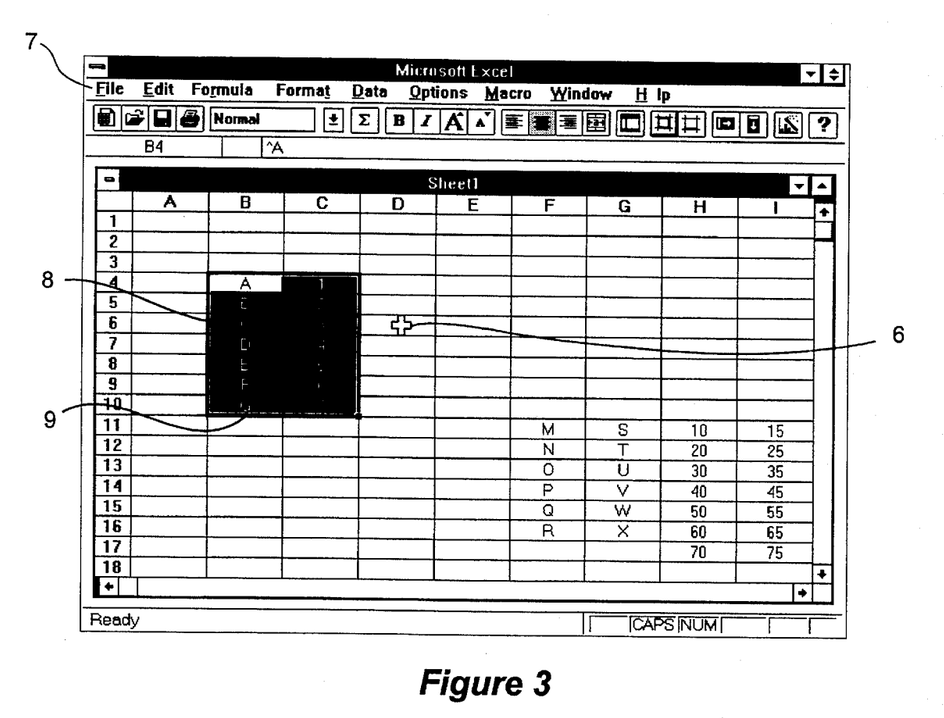
FIG. 3 shows a selected group of cells with a dark border in the electronic spreadsheet window, as viewed on the display screen of FIG. 1.
Figure 4:
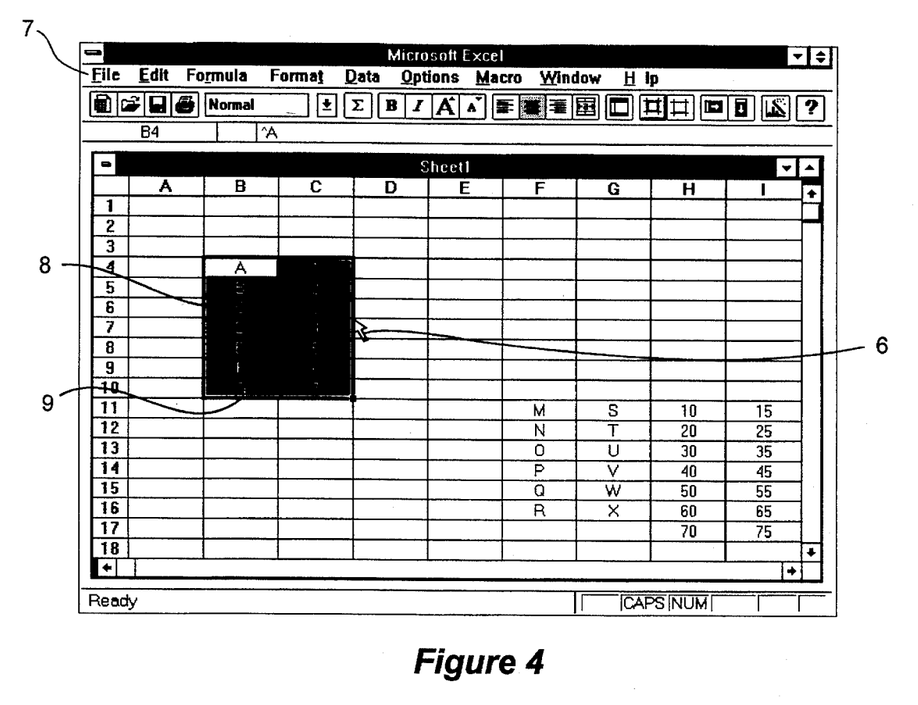
FIG. 4 shows the new shape of the pointer after a user positions the pointer over the border of the selected group of cells in the electronic spreadsheet window, as viewed on the display screen of FIG. 1.

FIGS. 3–8 are screen prints which illustrate a preferred embodiment of this invention. FIG. 3 shows a user selected group of cells 8 surrounded by a dark border 9 on the display screen. Note that the first cell selected remains white while the other selected cells are black. The pointer 6 remains in the shape of a plus sign while the selection is being made. After a selection is made, if the mouse button 3 is depressed when the pointer 6 is not over any part of the dark border of the selected cells 9, the selection is cancelled and a new active cell is created under the pointer. FIG. 4 shows the new shape of the pointer 6 after it has been positioned over the dark border 9 of the selected group of cells 8. In the preferred embodiment described herein, the pointer 6 takes the shape of a slanted arrow while it is positioned over the dark border 9 of the selected group of cells 8, indicating to the user that the border can be moved. After the group of cells is selected, it is treated as a single object.

Figure 5:
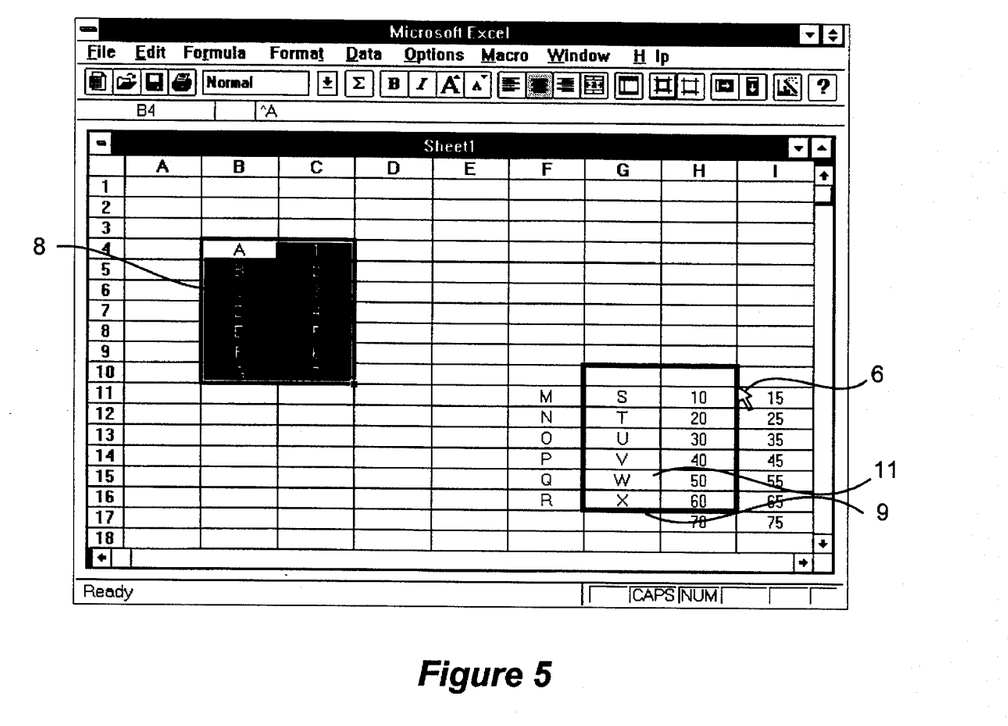
FIG. 5 shows the electronic spreadsheet window, as viewed on the display screen of FIG. 1 after a user has dragged the now movable border to the location where the selected group of cells is to be placed.

FIG. 5 illustrates the computer screen after the user has dragged the dark border 9 to the location 11 in the document where the selected group of cells 8 is to be placed. The dark border 9 was moved across the worksheet by the user positioning the pointer over the dark border, depressing a predefined mouse button, and then holding down the mouse button while repositioning the pointer.

Figure 6:
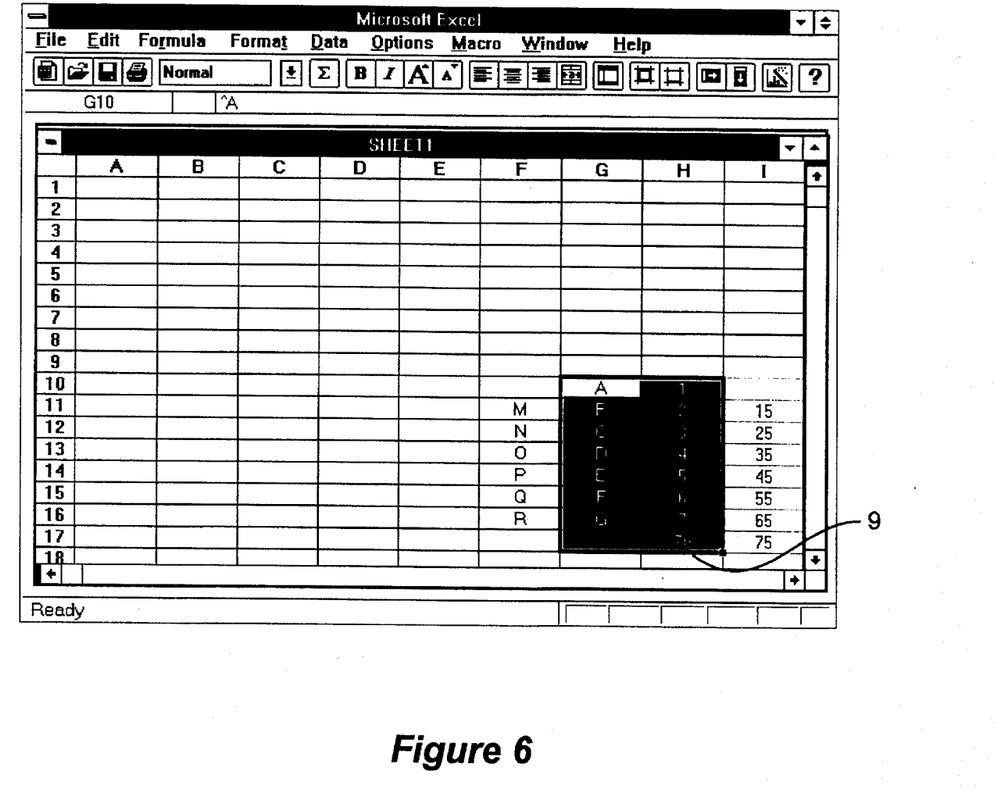
FIG. 6 shows the electronic spreadsheet window, as viewed on the display screen of FIG. 1, after a user has dragged the now movable border to a new location and released the predefined mouse button, causing the selected group of cells to be moved to the new location.

FIG. 6 shows the results of the cell manipulation, in this case a move operation. The contents of the selected group of cells 8 were moved to the cells 11 surrounded by the dark border 9 in FIG. 6 after the user released the mouse button. Note that in a default move operation, the contents of the selected group of cells 8 are placed over the contents of the existing group of cells 11 which are surrounded by the dark border 9. The contents of the selected group of cells 8 are cleared but the cells themselves are still present in the worksheet. In order for the selected group of cells to be deleted from the worksheet after the contents are moved, an entire row or column would have to make up the original selection. Referring to FIG. 6, if columns B and C had been selected instead of cells B4 through C10, then columns B and C would disappear and the columns to the right of column C would all shift to the left two columns after the move operation was completed.

Figure 7:
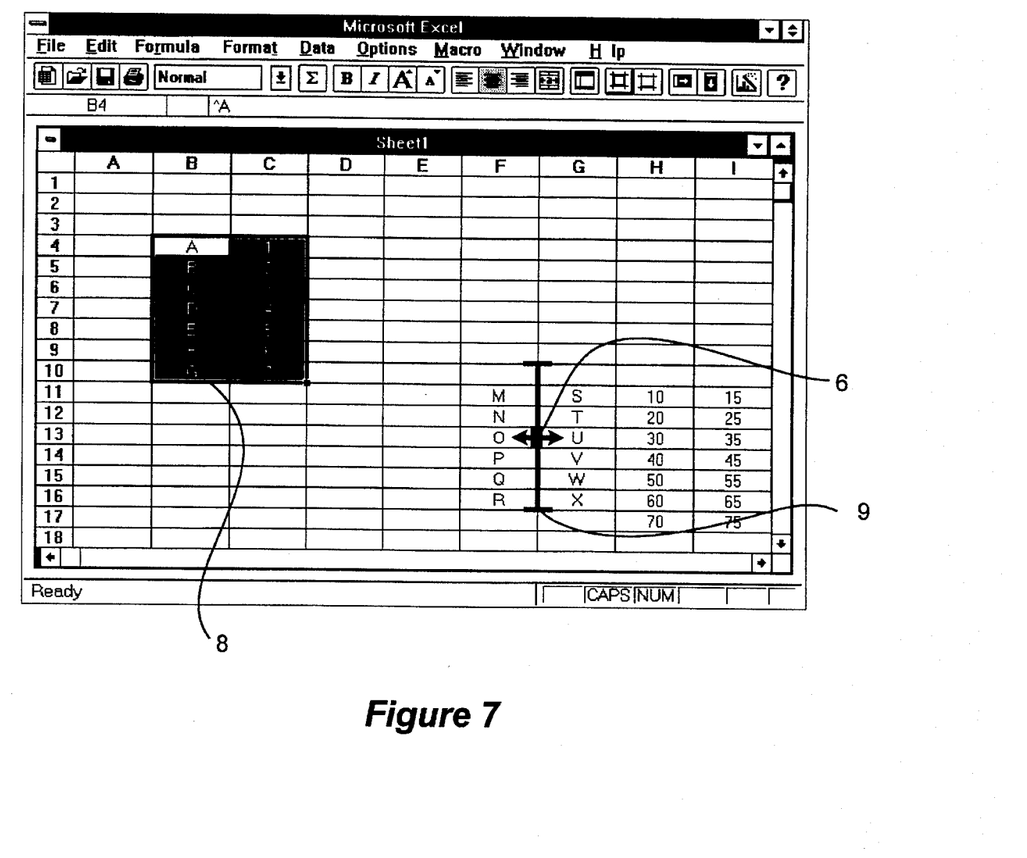
FIG. 7 shows the electronic spreadsheet window, as viewed on the display screen, after a user has positioned the pointer over the vertical gridline where the selected group of cells is to be inserted and the movable border has collapsed to signify an insertion.

FIG. 7 illustrates a move operation in which the selected group of cells 8 will be inserted between already existing cells in the worksheet rather than pasted over the existing cells. During the cell manipulation process, when the user is dragging the dark border 9 across the worksheet with the pointer 6, the dark border 9 collapses into an I-beam when the user depresses a predefined control key, such as the shift key. The I-beam is vertical or horizontal depending upon whether the pointer is positioned over a vertical or horizontal gridline. FIG. 7 shows an example of the dark border 9 after it has collapsed into a vertical I-beam, the height of the I-beam corresponding to the height of the selected group of cells 8. The pointer 6 also changes shape to indicate that an insert is about to occur. If the control key is released, the original expanded border reappears with its original size and shape. As alternate embodiments of the present invention, an insert mode could be activated in other ways.

Figure 8:
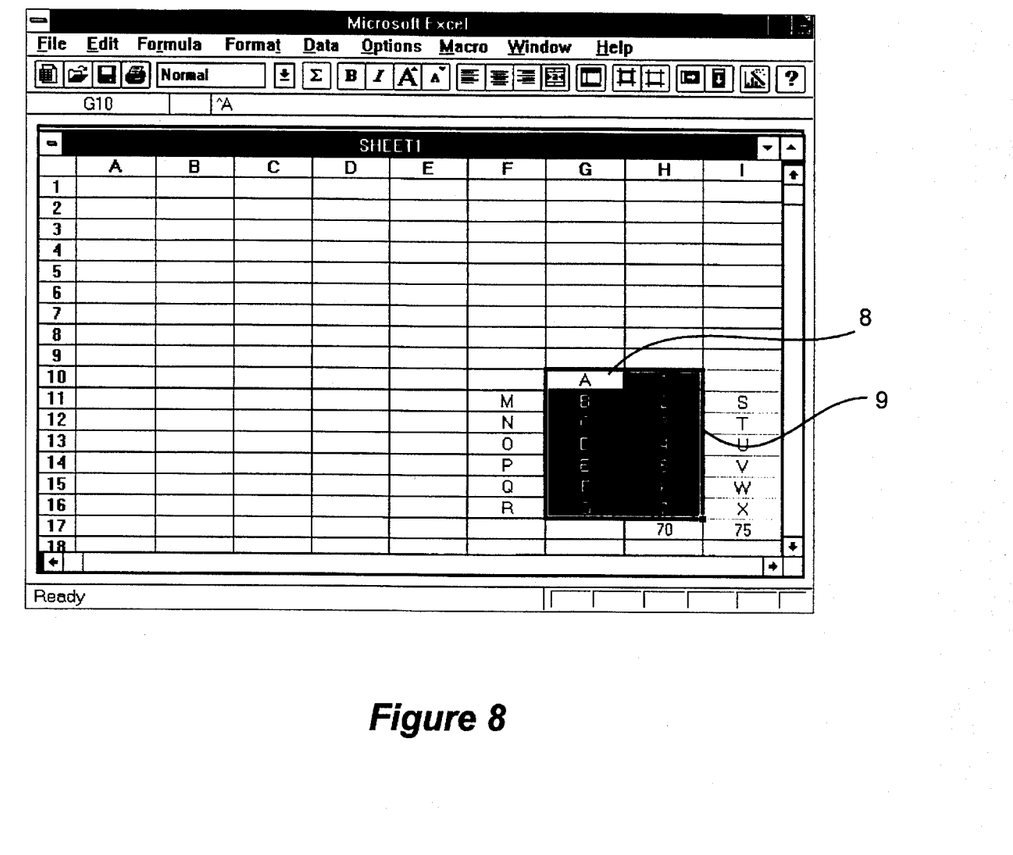
FIG. 8 shows an electronic spreadsheet window, as viewed on a display screen, after a user has collapsed the movable border over a vertical gridline and released the predefined mouse button, causing the selected group of cells to be inserted at that place in the worksheet.

FIG. 8 illustrates the computer screen after the user has dragged the dark border 9 to the location in the worksheet where the selected group of cells 8 is to be inserted. The selected group of cells 8 is inserted between the cells bounded by the I-beam. The example used in FIG. 8 shows that two columns were inserted into the worksheet corresponding to the two columns of the selected group of cells. Note that only rows 10 through 16 were affected by the insertion.

Figure 9A:
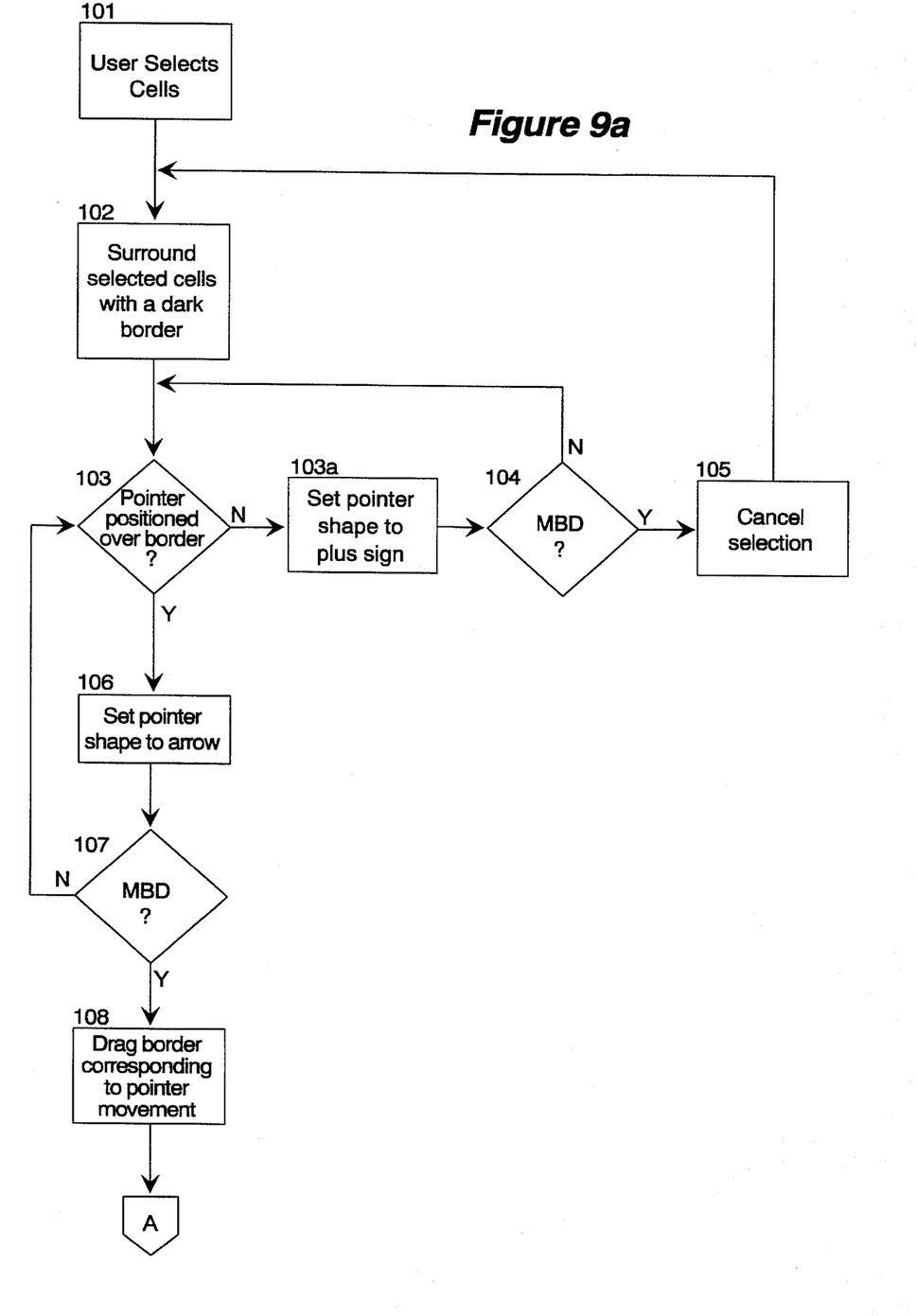
FIGS. 9a-9b are detailed flow diagrams of the cell manipulation process.
Figure 9B:
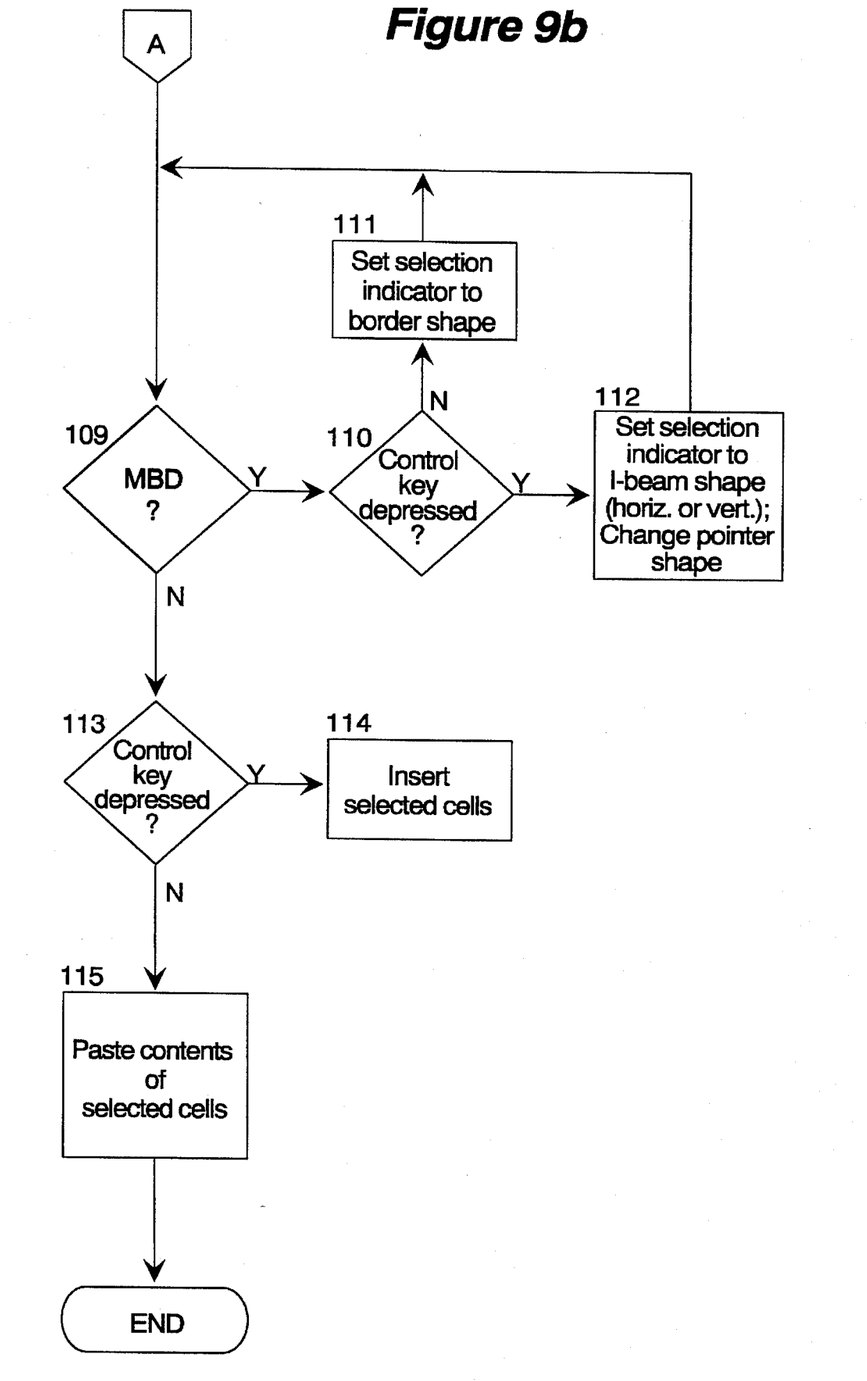

FIGS. 9a and 9b make up a detailed flow diagram of a preferred embodiment of this invention. The process begins with block 101, where the user must select a cell or group of cells in the worksheet. In block 102, the process creates an outside border around the selected cells as they are selected. The background of the cells will be black with the active cell remaining white. The active cell is the first cell in which the user positioned the pointer and initially depressed the mouse button. The process continues on to block 103 where it queries whether the pointer is positioned over any part of the outside border of the selected group of cells. If the pointer is not positioned over any part of the outside border of the selected group of cells, the process sets the pointer shape to a plus sign in block 103*a*. The process then queries in block 104 whether the mouse button is down. If the mouse button is down and the pointer is not positioned over any part of the outside border of the selected group of cells, the selection is cancelled in block 105, the highlighting disappears, and the user may make a new selection. The cell under the pointer when the mouse button is depressed becomes the new active cell. If the process determines in block 104 that the mouse button is not down, it loops back to block 103 to check the location of the pointer.

If the process determines in block 103 that the pointer is positioned over the outside border of the selected group of cells, it proceeds to block 106, where the pointer shape is changed. In the preferred embodiment described herein, the pointer is changed from its normal shape of a plus sign to a slanted arrow. Once the pointer is positioned over the outside border of the selected group of cells, the process queries in block 107 whether the mouse button is down. If the mouse button is not down, the process loops back to block 103 to check the location of the pointer. If the mouse button is down, the process continues on to block 108 where the outside border of the selected group of cells moves across the worksheet corresponding to the pointer movement. The border will always follow the user's drag instead of remaining with the selected group of cells. The outside border follows the pointer relative to the position where the border was picked up by the pointer. The user cannot see the actual data in the selected group of cells dragging along, just the shape indicated by the border. The moveable border remains the same shape and dimension as the selected group of cells, unless an insert is to occur. In the case of an insert, the border collapses to an I-beam. An insert operation is described below.

The process continues on to block 109 in FIG. 9B where it queries whether the mouse button is down. If the mouse button is down, the border is still moving around the worksheet relative to the user's movement of the pointer. In blocks 110–112, the process checks to see if the user has indicated that the selected cells should be inserted into the worksheet rather than pasted over existing cells. To visually confirm that an insert rather than a paste will occur when the mouse button is released, the moveable border is collapsed into an I-beam. The I-beam is horizontal if the insert is going to occur over a horizontal gridline, or vertical if the insert is going to occur over a vertical gridline. In a preferred embodiment of the present invention, the user must depress a predefined control key to cause an insertion or the process will paste the contents of the selected cells over existing cells in the worksheet. In block 110, the process queries whether a control key is depressed. A control key could be any predefined keyboard key or another predefined mouse button. If a control key is depressed, the process continues on to block 112 where the moveable border is changed to a horizontal or vertical I-beam, corresponding to whether the pointer is positioned over a horizontal or vertical gridline. The I-beam indicates that an insertion is going to occur if the mouse button is released while the control key is depressed. For inserts between columns, the collapsed border is a vertical, dark I-beam, with the same height as the number of rows that the insert is going to affect. The vertical, dark I-beam lets the user vertically align the cells about to be inserted using the end marks as visual cues. For inserts between rows, the collapsed border is a horizontal, dark I-beam, with the same width as the number of columns that the insert is going to affect. The horizontal, dark I-beam gives the same help in horizontally aligning the cells about to be inserted using the end marks as visual cues. Along with the I-beam, the pointer will also change shape to indicate an insertion. In the preferred embodiment described herein, the pointer shape is changed to arrows 6 which are shown in FIG. 8.

If the process determines in block 110 that a control key is not depressed, the process continues on to block 111 to change the shape of the moveable border back to its original expanded shape. After the shape of the moveable border has been changed in blocks 111 and 112, the process loops back to block 109 to check whether the mouse button is down. If the process determines in block 109 that the mouse button is not down, it skips to block 113 where it queries whether a control key is depressed. If a control key is depressed, the process continues on to block 114 where the selected cells are inserted into the worksheet at the location marked by the I-beam. If a control key is not depressed, the process skips to block 115 where it pastes the contents of selected cells over the cells which are bounded by the relocated border. The selected cells, in their original location in the worksheet, are cleared or deleted depending on whether the original selection encompassed an arbitrary selection, or an entire row or column.

Although the methods and systems of the present invention have been described in terms of preferred embodiments, it is not intended that the invention be limited to these embodiments. Modifications within the spirit the invention will be apparent to those skilled in the art. The scope of the present invention is defined by the claims that follow.

I claim:

1. A method of manipulating data in a computer system, the computer system having a display device and a user controllable pointer positioning device with signal generating means, the pointer positioning device controlling movement of a pointer displayed on the display device, wherein a program is operating on the computer system, the program using a worksheet to store and manipulate data, the worksheet consisting of a grid of intersecting columns and rows, wherein the intersection of each column and row is a cell capable of containing data manipulable by the program, the method comprising the steps of:

in response to input, selecting a cell or a plurality of cells in the worksheet;

displaying a border around the selected cell or plurality of cells;

in response to movement of the pointer positioning device, positioning the pointer over the border of the cell selection;

activating a drag mode in response to both the selection of the cells and the activation of the signal generating means while the pointer is positioned over the border, and without further user input or interaction;

in response to movement of the pointer positioning device while the drag mode is activated, positioning the border over a new area of the worksheet;

in response to deactivation of the signal generating means, deactivating the drag mode; and in response to deactivation of the drag mode and without further user input or interaction, moving the data contained in the selected cell or plurality of cells to the cells in the new area of the worksheet surrounded by the border thereby enabling the program to modify the moved data.

2. The method of claim 1 wherein the signal generating means comprises a button which is depressed to activate the signal generating means and which is released to deactivate the signal generating means.

3. The method of claim 1 wherein the step of positioning the pointer over the border further includes changing the shape of the pointer to indicate that the pointer is over the border.

4. The method of claim 1 wherein the step of activating a drag mode further includes coordinating movement of the border with movement of the pointer in such a way that any movement by the pointer is echoed by the border.

5. The method of claim 1 wherein the step of performing a cell manipulation further includes moving the contents of the selected cell or plurality of cells to the cells surrounded by the border.

6. The method of claim 1 wherein the step of moving the contents of the selected cell or plurality of cells includes the additional steps of:

when the cell selection includes less than an entire column or row of cells, removing the contents of the selected cells while leaving the cells present in the worksheet; and when the cell selection includes an entire column or row of cells, deleting the entire column or row of cells from the worksheet.

7. The method of claim 1 wherein the step of moving the contents of the selected cell or group of cells further includes copying the contents of the selected cell or plurality of cells to the cells surrounded by the border in the new area of the worksheet.

8. The method of claim 4 wherein the step of coordinating movement of the border with movement of the pointer includes the additional steps of:

visually indicating that an insertion is pending when the pointer is positioned over a vertical or horizontal gridline; and visually indicating that an overwrite is pending when the pointer is not positioned over a vertical or horizontal gridline.

9. The method of claim 8 wherein the border has dimensions including a width and a height, and wherein the step of visually indicating that an insertion is pending includes the additional steps of:

when the pointer is positioned over a vertical gridline, collapsing the border to a vertical I-beam having a length equal to the height of the border to indicate which cells will be affected by the pending insertion;

when the pointer is positioned over a horizontal gridline, collapsing the border to a horizontal I-beam having a length equal to the width of the border to indicate which cells will be affected by the pending insertion; and changing the shape of the pointer.

10. A method of moving data from a source cell or group of cells to a destination location in an electronic spreadsheet program operating on a computer system, the spreadsheet program using a worksheet to store and manipulate data, the worksheet comprising a grid of cells which contain data, each cell bounded by vertical and horizontal gridlines, the computer system comprising a display screen and a mouse that controls movement of a pointer on the display screen, the mouse includes having one or more mouse buttons for generating signals, the method comprising the steps of:

in response to movement of the mouse, selecting the source cell or group of cells;

displaying a border around the source cell or group of cells;

in response to movement of the mouse, positioning the pointer over the border of the source cell or group of cells;

in response to depression of a mouse button when the pointer is positioned over the border of the source cell or group of cells, activating a drag mode;

in response to movement of the mouse in the drag mode, repositioning the pointer and the border over the destination location;

when the pointer is positioned over a horizontal or vertical gridline of the destination location, changing the shape of the pointer to indicate that an insertion operation is pending;

when the pointer is positioned over a cell at the destination location, changing the shape of the pointer to indicate that an overwrite operation is pending;

in response to cessation of the depression of the mouse button, deactivating the drag mode;

in response to deactivation of the drag mode when the pointer is positioned over the vertical or horizontal gridline, inserting the data from the source cell or group of cells at the destination location marked by the pointer; and in response to deactivation of the drag mode when the pointer is positioned over the cell at the destination location, overwriting the data from the source cell or group of cells at the destination location marked by the pointer.

11. The method of claim 10 wherein the border has a width and a height and wherein the step of collapsing the border into an insertion indicator includes the additional steps of:

while the pointer is positioned over a horizontal gridline collapsing the border into a horizontal I-beam having a length equal to the width of the border; and while the pointer is positioned over a vertical gridline, collapsing the border into a vertical I-beam having a length equal to the height of the border.

12. A computer system for manipulating data, the computer system having a display device and a pointer positioning device with a signal generator, the pointer positioning device controlling movement of a pointer displayed on the display device, wherein a program is operating on the computer system, the program using a worksheet to store and manipulate data, the worksheet consisting of a grid of cells, each cell capable of containing data, comprising:

a selector for selecting a cell or a plurality of cells in the worksheet in response to input;

a displayer for displaying a border around the selected cell or plurality of cells;

a first positioner for positioning the pointer over the border of the cell selection in response to user movement of the pointer positioning device;

an actuator for activating a drag mode in response to both the cell selection and the activation of the signal generator while the pointer is positioned over the border, and without further user input or interaction;

a second positioner for positioning the border over a new area of the worksheet in response to movement of the pointer positioning device while the drag mode is activated;

a deactivator for deactivating the drag mode in response to user deactivation of the signal generating means; and a mover for moving the data contained in the selected cell or plurality of cells to the cells in the new area of the worksheet surrounded by the border so that the moved data can be modified by the program.

13. The computer system of claim 12 wherein the signal generator comprises a user controllable button which is depressed to activate the signal generator and which is released to deactivate the signal generator.

14. The computer system of claim 12 wherein the second positioner for positioning the pointer over the border additionally comprises a shape changer for changing the shape of the pointer to indicate that the pointer is over the border.

15. The computer system of claim 12 wherein the actuator for activating a drag mode additionally comprises a coordinator for coordinating movement of the border with movement of the pointer in such a way that any movement by the pointer is echoed by the border.

16. The computer system of claim 12 wherein the means for performing a cell manipulation additionally comprises the means for moving the contents of the selected cell or plurality of cells to the cells surrounded by the border.

17. The computer system of claim 12 wherein the mover for moving the contents of the selected cell or plurality of cells additionally comprises:

a remover for removing the contents of the selected cells while leaving the cells present in the worksheet when the cell selection includes less than an entire column or row of cells; and a deleter for deleting an entire column or row of cells from the worksheet when the cell selection includes the entire column or row.

18. The computer system of claim 12 wherein the mover for moving the contents of the selected cell or plurality of cells comprises a copier for copying the contents of the selected cell or plurality of cells to the cells surrounded by the border.

19. The computer system of claim 15 wherein the means for coordinating movement of the border with movement of the pointer additionally comprises:

a first visual notifier for visually notifying the user that an insertion is pending when the pointer is positioned over a vertical or horizontal gridline; and a second visual notifier for visually notifying the user that an overwrite is pending when the pointer is not positioned over a vertical or horizontal gridline.

* * * * *